UNITED STATES PATENT OFFICE.

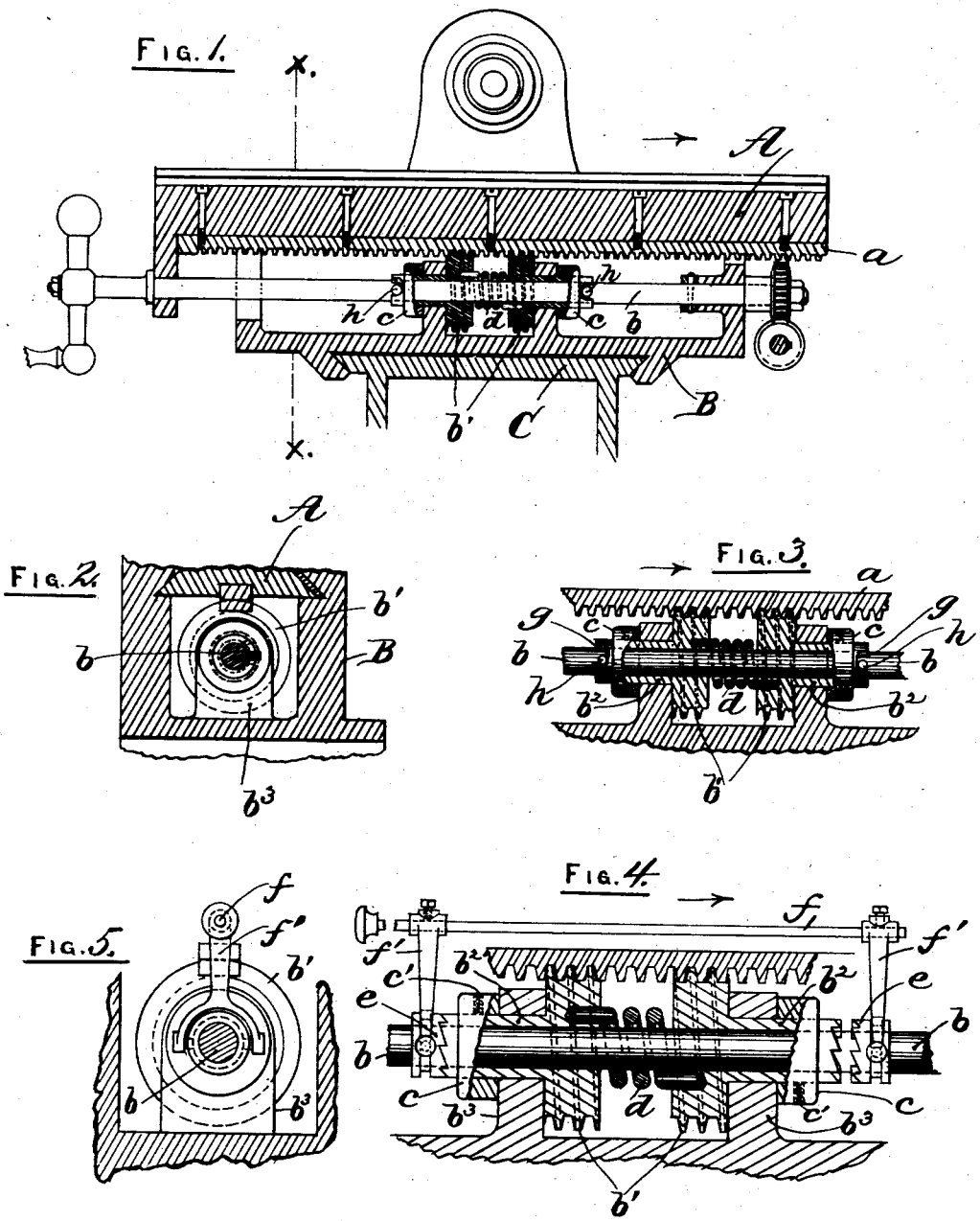

JOHN W. BOYNTON, OF PHILADELPHIA, PENNSYLVANIA, ASSIGNOR TO THE BROWN & SHARPE MANUFACTURING COMPANY, OF PROVIDENCE, RHODE ISLAND.

MECHANISM FOR TAKING UP LOST MOTION.

SPECIFICATION forming part of Letters Patent No. 525,781, dated September 11, 1894.

Application filed January 30, 1894. Serial No. 498,445. (No model.)

*To all whom it may concern:*

Be it known that I, JOHN W. BOYNTON, formerly of the city and county of Providence, in the State of Rhode Island, but now residing at Philadelphia, in the State of Pennsylvania, have invented certain new and useful Improvements in Mechanism for Taking Up Lost Motion; and I do hereby declare the following specification, taken in connection with the accompanying drawings, forming a part of the same, to be a full, clear, and exact description thereof.

My invention relates more particularly to taking up lost motion and preventing back-lash in a worm and rack feed, and is especially applicable for use in a machine, such as a milling machine for instance in which a traveling work-supporting carriage is fed by means of a rack and worm to present the work held upon such carriage to the action of a rotary cutter or other revolving tool. When in machines of this character the rotary cutter is revolved so that the motion of its under side is in the same direction that the carriage is fed, as is in many cases desirable, it is necessary that some provision should be made for taking up lost motion or preventing back-lash. In an application filed by Edward H. Parks of even date herewith means are shown and described for taking up lost motion and preventing back-lash in the feed of a work-supporting carriage when fed by a worm and rack feed, such means consisting generally in the employment of two worms engaging the rack on the carriage, one of said worms being fast on the worm-shaft and the other worm being loose on said shaft, and a torsion spring connected to said loose worm and tending to turn the same on said shaft. Experiment has shown that while such means are effective for accomplishing the desired result, it is impracticable, with such arrangement to return the carriage to its original position by the worm feed itself, and for the reason that a reversal of the direction of revolution of the worm-shaft results in a liability of the parts to become jammed. By reason of this difficulty it becomes practically necessary with said Parks arrangement, in order to run the carriage back easily, to disengage the worms from the rack and to provide other means for returning the carriage.

The primary object of the present invention is to provide means for taking up lost motion and preventing back-lash in a worm and rack feed which will by a simple manipulation enable the worm-shaft to be readily revolved and the rack to be fed in either direction without lost motion, and so that if said worm and rack feed be employed for feeding a work-supporting carriage, said carriage may be readily returned to its original position by said feed mechanism, and without the employment of other means for the purpose.

A further object of the invention is to provide means whereby the reversal of revolution of the worm-shaft will automatically effect the changes necessary to permit the rack to be readily fed in the opposite direction, and enable the lost motion to be taken up during such reverse movement of the feed.

To these ends the invention consists primarily in the combination with a rack of a worm shaft provided with two worms for engaging said rack, each of said worms being loose on said shaft, means for securing each of said worms alternately to said shaft, and a torsion spring connected to each of said worms, whereby first one and then the other of said worms may be made fast to the shaft, and whereby when one of said worms is thus made fast to the shaft, the other will be free to turn on said shaft under the action of said torsion spring.

The invention further consists in the combination with a rack of a worm shaft provided with two worms, each of said worms being loose upon said shaft, a torsion spring connected to each of said worms, and means whereby when the direction of revolution of said shaft is reversed, such reversal will automatically cause the proper one of said worms to be made fast to said shaft, and the other to be left free to turn under the action of said torsion spring.

In the accompanying drawings I have shown the invention as applied to a worm and rack feed in a milling machine, in which said drawings—

Figure 1 is a longitudinal section of a portion of a milling machine and so much of the mechanism for feeding the same as will be necessaary for an understanding of the present invention. Fig. 2 is a transverse section on the line $x, x$, Fig. 1. Fig. 3 is a detail on an enlarged scale of a portion of Fig. 1, and showing simply the rack itself as the thing to be fed. Fig. 4 is a view corresponding to Fig. 3, but upon a still larger scale, and showing that form of the invention in which the means for effecting the connection and disconnection of the worms with their shaft is made by hand instead of automatically; and Fig. 5 is an end view of Fig. 4.

A represents the work-supporting carriage of a milling or other machine arranged to slide in ways upon a second carriage B, said last named carriage being in turn arranged to slide in ways upon the frame C in the usual manner. To the under side of the carriage A is secured the rack $a$. The worm shaft $b$, which is to be revolved by any usual or suitable connection with the driving shaft of the machine, is provided with two worms $b'$, $b'$, both of which worms are loose on the shaft $b$ and both of which are arranged to engage with the teeth of the rack $a$. Each of said worms $b'$ is provided with an elongated hub $b^2$, each of which hubs extends through and has a bearing in a standard $b^3$ secured to the carriage B. Surrounding the outer end of each hub is a collar $c$ secured to said hub by a set-screw $c'$, said collars serving to prevent endwise movement of the worms upon the shaft $b$. A torsion spring $d$ connects the two worms $b'$, the ends of the wire composing said spring being bent and inserted in holes formed one in each of said worms, as shown in the drawings.

Referring first to the arrangement shown in Fig 4, each of the hubs $b^2$ is provided at its outer end with a clutch face adapted to be engaged by a sliding clutch member $e$ connected to the shaft $b$ by a groove and spline connection. A clutch shifting bar $f$ is connected by arms $f'$, $f'$, to each of said sliding clutch members $e$, and so that both of said clutch members may be operated simultaneously. The parts are so arranged that when one of said clutch members is engaged with its worm, the other clutch member will be disengaged from its worm, and so that when the bar $f$ is shifted the clutch member which had been in engagement will be disengaged, and the other clutch member will be brought into engagement with its worm. Thus each of the worms $b'$ may be alternately made fast to the shaft $b$, and so as to be revolved directly therewith, and when either of said worms is thus connected to the shaft the other worm will be free to turn on said shaft under the action of the torsion spring $d$. By this construction and arrangement the rack $a$ may be fed or moved in either direction by revolving the worm shaft $b$ in the proper direction, and in whichever direction the rack be fed all lost motion will be taken up and back-lash prevented. Thus, supposing it be desired to feed the rack in the direction of the arrow, Fig. 4, the parts will be in the position shown in said figure, that is, the clutch member $e$ at the left hand of said figure will be in engagement with the hub of the left-hand worm $b$, while the clutch member at the right hand of said figure will be disengaged from the hub of the left hand worm. The left hand worm will consequently be made fast to the shaft $b$, while the right hand worm will be free to turn on said shaft under the action of said torsion spring $d$, and if there be any play or lost motion between the teeth of the rack and the worms, said spring will serve to turn said right hand worm on said shaft and thus take up such lost motion, as clearly shown in said Fig. 4. If now the shaft $b$ be revolved in a direction to feed the rack in the direction of the arrow, the left hand worm, being fixed to the shaft for the time being, will be revolved directly with said shaft, while the right hand worm, being at the time loose upon the shaft, will be revolved by the shaft through the torsion spring, said loose worm by the action of said torsion spring still continuing to take up any lost motion that there may be, and also acting as the driver to move the rack, the fixed worm serving as a check to hold the rack against any thrust which may be brought upon it in the direction of its movement.

When it is desired to return the rack to its original position, or to feed it in the opposite direction, the sliding clutch members are shifted by means of the shifting bar $f$, so as to disengage the left hand clutch in Fig. 4 and engage the right hand clutch. This will have the effect to make the right hand worm fast to the shaft $b$, and to leave the left hand worm free to turn on said shaft under the action of the torsion spring $d$. By then revolving the worm shaft $b$ in the reverse direction, the operation of the parts will be reversed, and the rack may be readily moved back to its original position, any lost motion being taken up in the same manner as before.

Referring now to the arrangement shown in Figs. 1 and 3, instead of employing sliding clutch members and providing the ends of the hubs $b^2$ with corresponding clutch faces, an elongated slot or recess $g$ is formed in each one of said hubs, and the shaft $b$ is provided with two radially projecting pins or studs $h$ so arranged that one of said pins will project into each of the elongated slots in the hubs $b^2$. With this construction and arrangement when the shaft $b$ is revolved to feed the rack in the direction of the arrow, Fig. 3, the parts will be in the position shown in said figure, with the pin $h$ at the left hand in said figure in contact with the end of slot $g$ in the hub of the left hand worm, and so that as long as said shaft continues to be revolved in that direction said left hand worm will be revolved directly with said shaft and will be in effect made fast to said shaft. At this time the pin $h$ at the right hand end of said figure will be out of contact with the end walls of the slot $g$ in the hub of the right hand worm, and so that said right hand worm will be free to turn on the shaft under the action of the torsion spring $d$. Thus the rack will be fed in the direction of the arrow and any lost motion be taken up in the same manner as before. When it is desired to return the rack to its original position or to feed it in the opposite direction, all that is necessary to be done is simply to reverse the revolution of the shaft $b$. The first movement of the shaft in such reverse direction will cause the left hand pin $h$ to move away from the end of the slot $g$, thereby releasing the left hand worm, while the further movement of the shaft will serve to bring the right hand pin $h$ into contact with the opposite end of the slot $g$ in the hub of the right hand worm, and so that in the continued movement and revolution of the shaft in such reverse direction, the right hand worm will be revolved directly with the shaft and will be in effect made fast to the shaft, while the left hand worm will be free to turn on the shaft under the action of the torsion spring. Thus the operation of the parts will be directly reversed, and the rack may be readily fed in the opposite direction and without lost motion. It will be understood that each of the slots $g$ is to be of sufficient length to permit the worm which for the time being is free to turn, to be turned by the torsion spring a sufficient distance to take up any possible amount of lost motion which there may be.

It will be seen that with the construction and arrangement last described no hand manipulation is required to effect the reversal of the parts, but that instead the reversal of the shaft itself serves to automatically effect the changes required, and so that all that is necessary when it is desired to move the rack first one way and then the other is simply to reverse the revolution of the worm shaft.

It will further be seen that with both of the arrangements above described the rack, by a proper manipulation of the parts, may be freely moved first in one direction and then in the other, and so that if such worm and rack feed be employed for feeding the work-supporting carriage of a milling machine for instance, said carriage may be fed to present the work to a rotary cutter revolving in the same direction that the carriage is moved without lost motion or back-lash, and also that said carriage may be readily run back by the same feed mechanism which advanced it, and without the employment of additional means for that purpose. It will also be understood that with either of said arrangements, not only may the carriage be fed in either direction without back-lash, but when a revolving cutter is employed to operate upon the work held upon said carriage, said cutter may be revolved in either direction with relation to the movement of the carriage.

If desired, instead of employing a single torsion spring connecting one of the worms with the other, two separate torsion springs may be employed, one for each of said worms, each of said springs being connected at one end to one of said worms and being secured at its other end to the shaft.

What I claim as my invention, and desire to secure by Letters Patent, is—

1. The combination, with a rack, of a worm-shaft provided with two worms for engaging said rack, each of said worms being loose upon said shaft, and a torsion spring connected to each of said worms and tending to turn the same on said shaft, substantially as described.

2. The combination, with a rack, of a worm-shaft provided with two worms for engaging said rack, each of said worms being loose upon said shaft, a torsion spring connected to each of said worms, and tending to turn the same on said shaft, and means for connecting one or the other of said worms to said shaft, substantially as described.

3. The combination, with a rack, of a worm-shaft provided with two worms for engaging said rack, each of said worms being loose upon said shaft, a torsion spring connected to each of said worms, and means for alternately connecting one of said worms to said shaft and disconnecting the other worm therefrom, whereby when one of said worms is made fast to the shaft, the other will be free to turn on said shaft under the action of said torsion spring, substantially as described.

4. The combination, with a rack, of a worm-shaft provided with two worms for engaging said rack, each of said worms being loose upon said shaft, a torsion spring connected to each of said worms, and means for automatically connecting each of said worms alternately to said shaft by the reversal of the direction of revolution of said shaft, substantially as described.

5. The combination, with a rack, of a worm-shaft provided with two worms for engaging said rack, each of said worms being loose upon said shaft, and each provided with a clutch member, a torsion spring connected to each of said worms, two movable clutch members arranged to engage one with each of the clutch members upon said worms, and means for shifting said movable clutch members simultaneously, whereby when one of said clutch members is brought into engagement, the other will be thrown out of engagement, substantially as described.

6. The combination, with a rack, of a worm-shaft provided with two worms for engaging said rack, said shaft being provided with projecting pins to engage said worms, each of said worms being loose upon said shaft and being provided with an elongated slot to receive one of the pins projecting from said shaft, and a torsion spring connected to each of said worms, whereby as said shaft is revolved in one direction one of said worms will be connected to said shaft so as to be revolved directly therewith, while the other worm will be left free to turn on said shaft under the action of said torsion spring, and whereby a reversal of the direction of revolution of said shaft will automatically disconnect from said shaft the worm previously connected thereto, and connect the other worm with said shaft, substantially as described.

7. The combination, with the work-supporting carriage of a milling or other machine, of a rack secured to said carriage, a worm-shaft provided with two worms for engaging said rack, each of said worms being loose upon said shaft, a torsion spring connected to each of said worms, and means for connecting one or the other of said worms to said shaft, substantially as described.

8. The combination, with the work-supporting carriage of a milling machine, of a rack secured to said carriage, a worm-shaft provided with two worms for engaging said rack, each of said worms being loose upon said shaft, a torsion spring connected to each of said worms, and means for automatically connecting each of said worms alternately to said shaft by the reversal of the direction of revolution of said shaft, substantially as described.

JOHN W. BOYNTON.

Witnesses:
ERNEST HOWARD HUNTER,
JAMES HOWLAND.